June 12, 1923.

F. HUNZIKER 1,458,883

CLOSURE FOR RECEPTACLES

Filed March 30, 1921

2 Sheets-Sheet 1

Inventor-
Franz Hunziker
by B. Singer, Atty.

June 12, 1923.

F. HUNZIKER 1,458,883

CLOSURE FOR RECEPTACLES

Filed March 30, 1921

2 Sheets-Sheet 2

Inventor-
Franz Hunziker,
By A. Finger, Atty.

Patented June 12, 1923.

1,458,883

UNITED STATES PATENT OFFICE.

FRANZ HUNZIKER, OF LUCERNE, SWITZERLAND.

CLOSURE FOR RECEPTACLES.

Application filed March 30, 1921. Serial No. 456,866.

(GRANTED UNDER THE PROVISIONS OF THE ACT OF MARCH 3, 1921, 41 STAT. L., 1313.)

*To all whom it may concern:*

Be it known that I, FRANZ HUNZIKER, a citizen of the Swiss Confederation, residing at Casimir Pfyfferstrasse No. 20, Lucerne, Switzerland, have invented new and useful Improvements in Closures for Receptacles (for which I have filed applications in Great Britain July 6, 1920, and Germany January 9, 1918), of which the following is a specification.

In the case of oil level indicators, sight feed lubricators and other appliances for easily penetrable fluids, such as oils, petroleum and such like, a perfectly impenetrable and durable packing between the transparent fluid container or show glass and the connecting parts has not hitherto been obtainable. Experience has shown that in time certain fluids penetrate or destroy the packing rings made of leather, rubber, cork and such like for the glasses hitherto used. The packing rings, moreover easily get out of order or become damaged when they are soaked on loosening the connection for the purpose of filling, emptying or cleaning the container.

In order to overcome these difficulties, efforts have been made to dispense with special packing by grinding together the transparent containers made of glass with their unions. Apart from the difficult and expensive construction the problem was only partly solved thereby and then only for certain purposes, e. g. for glass bottles with glass stoppers.

According to the present invention, the transparent fluid container or show glass is made from elastic, transparent material, suitable for packing, such as, for instance, celluloid or cellon and is connected direct to the unions under pressure thus without the intervention of special packing whereby the elastic material of the container makes a perfectly durable and impenetrable joint with the unions and without breaking out, even when frequently unfastened.

Figure 1:
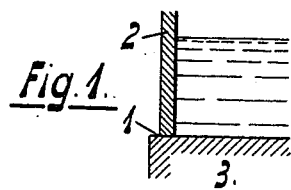

In the accompanying drawings in which various forms of my invention are illustrated, Fig. 1 shows a flat mouth 1 of the transparent container 2, to the width of the thickness of plate—which is pressed against a flat union 3.

Figure 2:
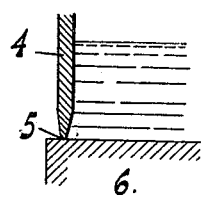

According to Fig. 2 the plate of the container 4 by the mouth 5 is somewhat pointed, thereby obtaining a thinner fluid-tight surface which fits close under a slighter pressure of the union 6.

Figure 3:
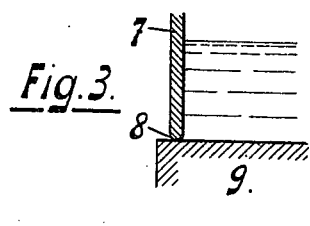

According to Fig. 3, the walling of the container 7 is rounded off at the mouth 8 and is in contact with the flat union 9 at one point only. The latter transforms itself with slight pressure into a thin fluid-tight surface with high specific pressure.

Figure 4:
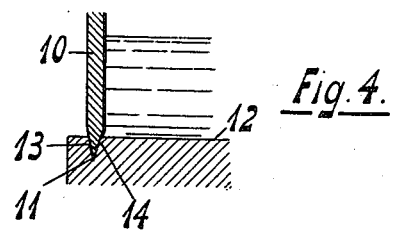

Fig. 4 shows a mouth with the walling 10 brought to a conical point from both in and outside,—which mouth fits into a corresponding groove 11 on the union 12 and sits close to both the conical surfaces 13 and 14. There is therefore a double fluid-tight surface. It may also be provided with an outer or inner bevel only as a fluid-tight surface.

Figure 5:
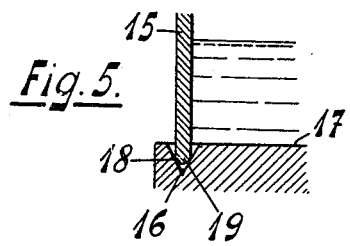

Fig. 5 shows a mouth with rounded off walling 15 which fits into a conical groove 16 on the union 17 and comes into contact with same at 2 points 18 and 19, which, on slight pressure, are transformed into thin fluid-tight surfaces. In this case also a double-fluid tight surface is obtained. The rounded off walling has the advantages, as compared with all other forms, of being most easily fitted, most fluid-tight and possessing the greatest durability.

Figure 6:
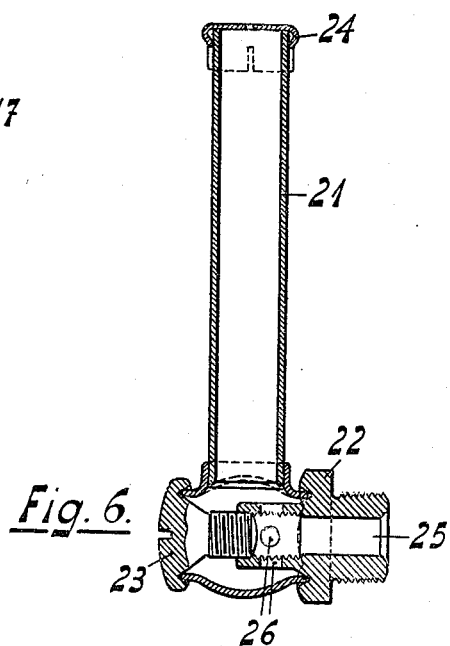

Fig. 6 of the drawing shows, as an example an oil-level indicator, constructed in conformity with the invention, with a ⊥-shaped gauge tube 21, seating nipple 22, pressure screw 23 and closing cap 24. The seating nipple 22 is provided with longitudinal and transverse holes 25 and 26 respectively for the passage of the oil. This appliance can also be used for draining off the oil by means of taking out the gauge tube 21 from its seating arrangement 22 and 23. Its fluid-tight portions are formed in accordance with Fig. 5. Instead of forming a fluid-tight surface with the front side of the mouth—the transparent container may also be made to make a fluid-tight contact between the inner or outer wall surfaces and the unions, which is, for instance, the case when same is fixed right over the union or is firmly pressed inside same. The elastic transparent container thereby easily clings closely to the union by means of the great elastic properties of its walls and forms a perfectly fluid-tight container, without the intervention of any packing.

Figs. 7, 8, 9 and 10 show some examples of this.

Figure 7:
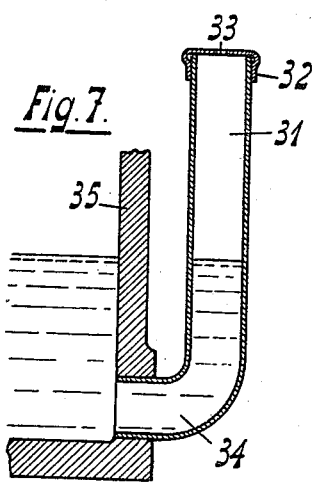

Fig. 7 shows a simple oil or fluid level indicator consisting of one transparent angularly bent gauge tube 31 only, which is closed at the top by a cap 32 with air-hole 33 and with its outer, very slightly reduced end of the lower horizontal arm 34 inserted in an aperture in the wall of the container 35. No packing or any special method of fixing is provided for the gauge tube.

Figure 8:
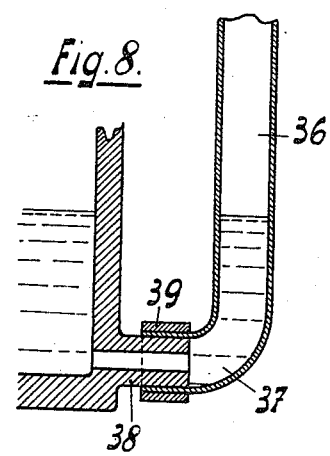

Fig. 8 shows a fluid level indicator similar to Fig. 7. The transparent gauge tube 38 of this is, however, firmly and tightly fitted over a tube seating, cast in one piece, with or fixed to the container by its lower horizontal arm. For the purpose of strengthening the gauge tube, a collar may be fitted round its junction end.

In accordance with the invention, straight or bent transparent gauge tubes can also be firmly and sightly fitted, without the use of packing, in an aperture of the wall of the container, or a junction piece on the latter or on a straight or bent tube seating on the container.

In the case of closed fluid containers, possible also under pressure, the gauge tubes can still be fitted to the container in the same or a similar manner.

It is also possible, in a similar manner as in the case of fluid level indicators, to improve the tightening of the transparent vessels of other apparatus such as—for instance, the supply reservoir and the show glass of sight feed lubricators in respect of which the tightening has hitherto left much to be desired.

Figure 9:
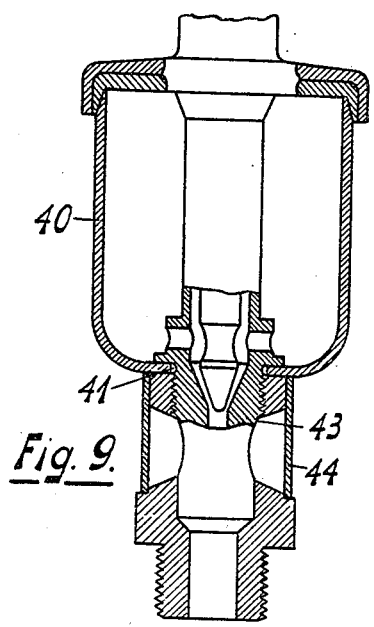

Fig. 9 shows by way of example, a sight feed lubricator, the transparent supply reservoir and the show glass of which are tightened in accordance with the invention. The supply reservoir 40 is in this case formed of transparent celluloid or cellon in the shape of a calix. The metal parts go below through an aperture 41 in the bottom of the cup-reservoir 40. The tightening at the spot where the drip takes place is effected by means of screwing up the reservoir without the use of any kind of packing whatsoever. The show glass is firmly and tightly fitted outside over the base 43 of the sight lubricator. This gives for the bases a very simple, easy and yet substantial piece and a large surface for the show glass, which is quite smooth outside and does not favour the settling of dust and dirt like the smaller glass which rendered observation very difficult, hitherto fitted into the base. In this manner, besides the two packings, two screw threads are also saved as compared with previous types.

Figure 10:
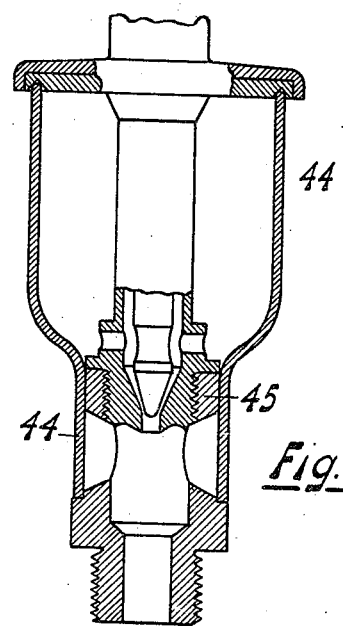

Fig. 10 shows a sight feed lubricator in the case of which the transparent reservoir and the transparent closing of the drip chamber are produced from a single piece 44, and, without the use of any packing, are firmly and tightly fitted over the base of the sight feed lubricator. A very simple and one-piece lower tightening arrangement is thereby obtained.

Having now particularly described and ascertained the nature of my said invention and in what manner the same is to be performed, I declare that what I claim and wish to secure by Letters Patent in the United States is:—

1. Transparent closing for easily penetrable fluids such as oil, petroleum, and such like, characterized by the circumstance that same consists of elastic transparent material so that it can be made tight by pressure against the connecting body without the use of packing material.

2. Transparent closing, in accordance with claim 1 characterized by the circumstance that it consists of celluloid.

3. Transparent closing, in accordance with claim 1, characterized by the circumstance that it consists of noninflammable celluloid which is known in commerce under the names of cellon, cellonite, etc.

4. Transparent closing in accordance with claim 2, characterized by the circumstance that, in the case of fluid level indicators it consists of a tube which is firmly and tightly connected to a duct with which the container is provided.

5. A container embodying an element and a second element including a wall of elastic and transparent material, the said wall being pressed against the first-named element to form a fluid-tight joint therebetween.

6. A container embodying an element and a second element including a wall of elastic and transparent material, the edge of said wall being pressed against the first named element to form a fluid-tight joint therebetween.

In witness whereof I affix my signature.

FRANZ HUNZIKER.

Witnesses:
 M. JUND,
 E. L. DACHS.